Nov. 4, 1924.
E. C. WHALEN ET AL
1,514,276
SWIVEL JOINT COUPLING
Filed June 4, 1923
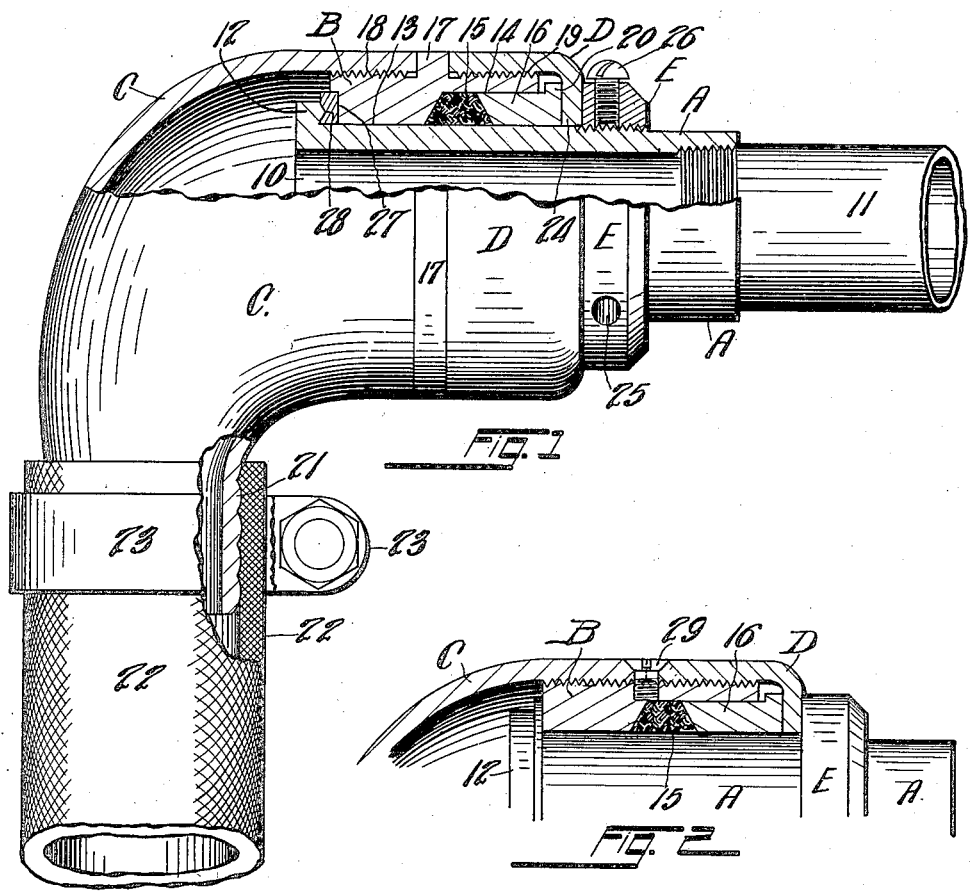
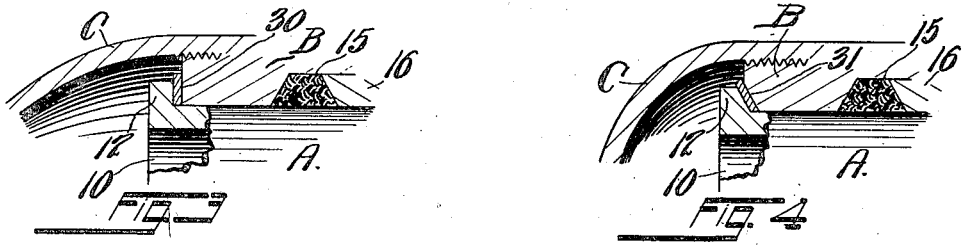
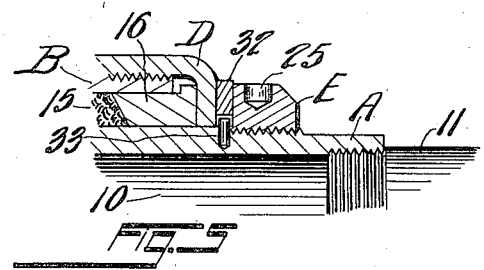
INVENTORS
E.C. Whalen
A.G. Gebhart.
By C.T. Heinkel,
ATTORNEY Patented Nov. 4, 1924.

1,514,276

UNITED STATES PATENT OFFICE.

EDWARD C. WHALEN, OF LAKEWOOD, AND ALEXANDER G. GEBHART, OF CLEVELAND, OHIO.

SWIVEL-JOINT COUPLING.

Application filed June 4, 1923. Serial No. 643,227.

*To all whom it may concern:*

Be it known that we, EDWARD C. WHALEN and ALEXANDER G. GEBHART, both citizens of the United States, and residents, respectively, of Lakewood and of Cleveland, in the county of Cuyahoga and State of Ohio, have invented a new and useful Improvement in Swivel-Joint Couplings, of which the following is a specification.

Our invention relates to couplings in which one member can rotate or swivel on another member.

The main object of our invention is a simple and efficient coupling in which one member can rotate or swivel on another member without leakage between these members and in which the outlet of the coupling is interchangeable. Other objects will appear during the description of the apparatus shown in the drawing.

In many instances, as in the gasolene hose connection in gasolene stations, or in air hose connections in foundries for instance, it is necessary to provide a rotary or swivel joint which does not leak but which permits the hose, or whatever terminal is used, to swivel or otherwise move in relation to the usually stationary means which supplies the fluid pressure to be conveyed through the coupling. It is also desirable that the outlet part of the coupling is made separate so that interchangeable outlets may readily be attached to the coupling.

In order to attain our objects, in view of the necessary requirements, we have invented certain combinations of elements. One such combination is illustrated in the accompanying drawing in which Fig. 1 is a general side view of a swivel joint coupling, partly in section to show the relations between the elements clearly, and also showing the relation of the coupling to a gasolene dispensing apparatus and to the dispensing hose thereof and also showing one manner of securing the outlet to the other portion of the coupling; Fig. 2 is a fragmental sectional view showing a modified joint between the outlet and the swivel portion of a coupling; Fig. 3 is a fragmental sectional view showing a modified joint between the stationary and the swivel portions of the coupling; Fig. 4 is a fragmental sectional view showing another modified joint between the stationary and the swivel portions of the coupling; Fig. 5 is a fragmental sectional view showing a modified means for locking the adjusting nut to the stationary member.

Similar reference characters refer to similar parts throughout the views.

Referring now particularly to Fig. 1,

The coupling shown here is composed, principally, of the stationary member A, the swivel member B, the outlet member C, the cap D, and the nut E. The members A and E compose the stationary portion of the coupling and the members B, C, and D compose the rotary or swivel portion of the coupling.

It is observed that the coupling is composed of two units, one unit comprises the members A, B, D, and E and includes the joint elements while the other unit comprises the member C which can be attached to or changed on the first unit without interfering with the adjustments or other relations of the members of this first unit.

The stationary member A is tubular in form with the hole 10 all the way through and is internally threaded at one end for the pipe 11 which leads to a gasolene dispensing apparatus. The head 12 is provided on one end of this member A and the other end thereof is threaded externally for the nut E; the purpose whereof will appear presently.

It is to be observed that the inner face of the head 12 forms a sealing seat either directly on the member B or on a washer interposed as shown in the drawing.

The swivel member B is journaled on the member A at 13 and is provided with a counterbore 14 for the packing 15 and for the gland 16. This member B is further provided with the flange 17 and with threads 18 and 19 respectively adjacent this flange 17.

The gland 16 fits rotatably over the member A and is disposed in the counterbore 14. One end of this gland bears against and compresses the packing 15 and the other end is provided with the flange 20 bearing against the cap D for the purpose appearing presently.

The outlet member C is formed as an elbow, is internally threaded at one end to engage the threads 18 on the member B, and this end of the member C is screwed tight against one side of the flange 17. The other end of this member C is provided with the corrugations 21 to engage the hose 22 which is held thereon by the hose clamp 23.

The cap D is threaded internally at one end to engage the threads 19 on the member B and this end of the member D is screwed tight against the other side of the flange 17. The other end of this member D is provided with the wall 24 the inside of which bears against the flange 20 on the gland 16. The spanner holes 25 are provided for the purpose of taking hold of the cap D to securely tighten the same against the flange 17.

The nut E is threaded to the externally threaded end of the member A and bears against the outside of the wall 24 and is provided with the set screw 26 to lock the nut E in adjusted position.

The washer 27, here made of leather, is countersunk into the end of the member A and forms a seal between the head 12 and the member A. The inner face of the head 12 is provided with the circular projection 28 to further increase the efficiency of the sealing means between the stationary and the rotary or swivel elements of the coupling.

Referring now particularly to Fig. 2, Instead of providing the member B with the flange 17 shown in Fig. 1, this structure may be modified by eliminating the flange 17 and providing threads along the entire outer circumferential surface of the member B and screwing the members C and D thereon, from each side thereof, so that the ends of these members C and D firmly abut each other. The screw 29 is provided to form an additional safeguard to insure the unitary rotation or movement of the members B, C, and D. A safeguard of a similar nature may also be provided on the flange 17 between the members B, C, and D of Fig. 1.

Referring now particularly to Fig. 3, Instead of the leather washer 27 shown in Fig. 1, the flat washer 30, of copper or other metal adapted for sealing purposes apropos to the object in hand, may be substituted and the projection 28 shown in Fig. 1 may be eliminated.

Referring now particularly to Fig. 4, Instead of the flat washer 30 shown in Fig. 3, or the washer 27 shown in Fig. 1, the conical washer 31, made of suitable material, may be employed with suitable modifications of the head 12 and the end of the member A.

The purpose of these washers 27, 30, or 31 being to form a leakproof joint between the stationary and the rotary or swivel portions of the coupling so that one portion can rotate or swivel in relation to the other portion without leakage therebetween.

Referring now particularly to Fig. 5, Instead of the set screw 26 in the nut E shown in Fig. 1, the washer 32 may be introduced between the nut E and the cap D. This washer 32 is prevented from rotation, in relation to the member A and the nut E, by the pin 33 fixed in the member A and extending into a key way in the washer 32.

The purpose of locking the nut E to the stationary member A is to a retain the head 12 on its seat and to permit the members B, C, and D to rotate without rotating the nut E so that this nut will not unscrew and destroy the sealing feature between the head 12 and the member A when the members B, C, and D are rotated.

When this coupling is in operation, with the head 12 properly adjusted against its seat by the nut E, and this nut locked in adjusted position, an efficient and effective seal is formed between the stationary and the rotary or swivel portions of the coupling and this rotary or swivel portion of the coupling is confined endwise on the stationary portion of the coupling.

This sealing feature is further augmented, to form an efficient sealing means, by the packing 15 which is compressed into place by the cap D acting endwise on the gland 16.

This sealing and packing arrangement provides a double sealing means between the stationary and the rotary or swivel portions of the coupling to prevent leakage when a fluid pressure passes through the coupling or is confined therein.

When the free end of the hose 22 is conveyed to different localities, the rotatable portion of the coupling rotates or swivels on the stationary portion and follows the lead of the hose sidewise, thereby preserving the hose by preventing kinks therein and also lessens the effort required, on the part of the operator, to manipulate the free end of the hose.

It is to be observed that the outlet member C, here shown as an elbow, is individually secured to the other members of the rotary portion of the coupling. Therefore, this member C is interchangeable so that outlets of other formation, such as a T, or other multiple opening outlet, or an outlet of other than the right angle one shown, may be substituted without affecting the remainder of the structure.

Modifications other than those herein pointed out may be made. It is believed that those herein pointed out are sufficient to convey the general requirements to accomplish the aims of the present invention. Without limiting ourselves to the precise construction and arrangement of elements, and the precise function of these elements shown and described,

We claim:—

1. A swivel joint coupling composed of two units, one of said units comprising a stationary member, a swivel member rotatable on said stationary member and provided with means for engaging the other of said units, the function of said engaging means independent of the function of the other members of the first said unit, sealing means between said stationary and said swivel members, and the second of said units comprising an outlet member provided with means adapted to said engaging means on the swivel member to permit attaching and changing of said outlet member on the first said unit without affecting the relations of the members thereof, and means for locking said second unit to said first unit after the former has been attached to the latter so that the rotation of said second unit also rotates the rotatable members of said first unit.

2. A swivel joint coupling composed of two units, one of said units comprising a stationary member provided with a head on one end thereof, a swivel member rotatable on said stationary member and provided with means for engaging the other of said units and with a counterbore in one end thereof, the function of said engaging means independent of the function of the other members of the first said unit, a sealing washer between said head and the other end of said swivel member, packing in said counterbore, means for adjusting said head to retain said sealing washer on said other end of the swivel member without affecting the adjustment of said packing, means for adjusting said packing independent of the adjustment of said head, and the other of said units comprising an outlet member provided with means adapted to said engaging means on the swivel member to permit attaching and changing of said outlet member on the first said unit without affecting the relations of the members thereof.

3. A swivel joint coupling composed of two units, one of said units comprising a stationary member provided with a head on one end thereof and with means for connection to an auxiliary apparatus on the other end thereof, a swivel member rotatable on said stationary member and provided with threads on the outer circumferential surface thereof and with a counterbore in one end thereof, a sealing washer between said head and the other end of said swivel member, packing in said counterbore, a gland in said counterbore adjacent said packing, a cap engaging one end of said threaded outer circumferential surface of the swivel member and bearing against said gland for adjusting said packing independent of the adjustment of the other members of the first said unit, an adjusting nut threaded to said stationary member and bearing against said cap for adjusting said head to retain said sealing washer on said other end of the swivel member without affecting the adjustment of said packing, means for locking said adjusting nut to said stationary member in adjusted position, and the other of said units comprising an outlet member having one end thereof threaded to engage the other end of said threaded outer circumferential surface of the swivel member without affecting the relations of the members of the first said unit and having the other end thereof provided with means for attaching a hose thereto.

EDWARD C. WHALEN.
ALEXANDER G. GEBHART.